D. SMITH.
Urine-Guard for Water-Closet Seats.
No. 217,163.    Patented July 1, 1879.
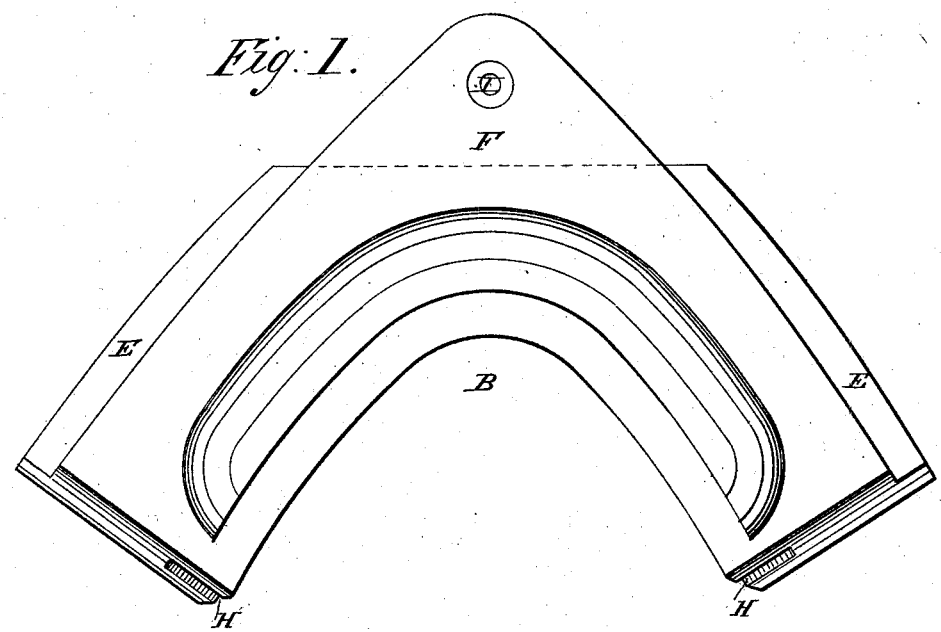
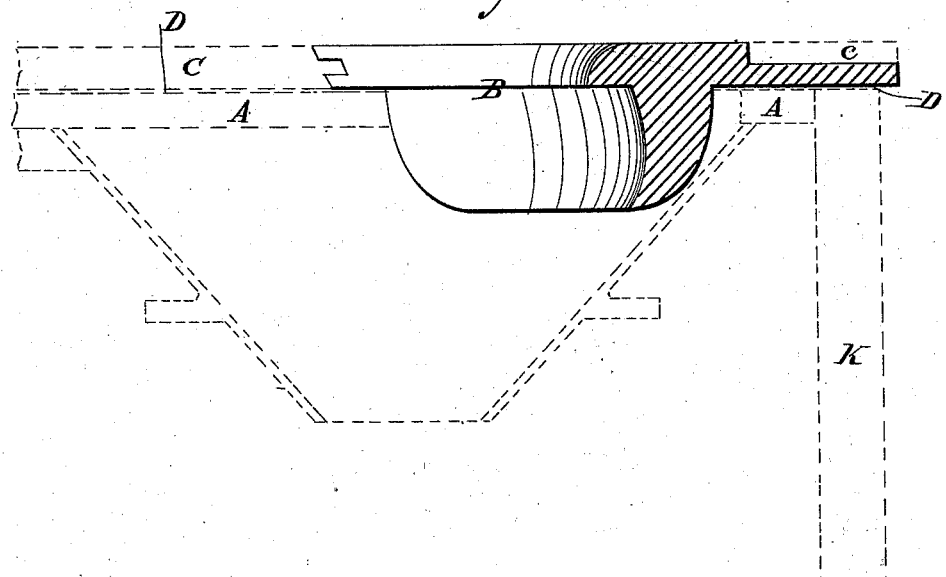
WITNESSES:
Achilles Schehl.
C. Sedgwick
INVENTOR:
D. Smith
BY Munn & Co
ATTORNEYS.

UNITED STATES PATENT OFFICE.

DAVID SMITH, OF BOSTON, MASSACHUSETTS, ASSIGNOR TO HIMSELF AND GEORGE C. FORBES, OF SAME PLACE.

IMPROVEMENT IN URINE-GUARDS FOR WATER-CLOSET SEATS.

Specification forming part of Letters Patent No. 217,163, dated July 1, 1879; application filed December 19, 1878.

*To all whom it may concern:*

Be it known that I, DAVID SMITH, of Boston, in the county of Suffolk and State of Massachusetts, have invented a new and Improved Urine-Guard for Water-Closet Seats, of which the following is a specification.

Figure 1 is a view, showing the under side of the guard. Fig. 2 is a sectional elevation, showing the attachment of the guard to a water-closet seat.

Similar letters of reference indicate corresponding parts.

The object of this invention is to direct the urine, when one is urinating, into the bowl of the water-closet, to prevent it from passing or flowing between the seats thereof or between the seat and the top of the bowl.

The guard is preferably made of glass or glazed earthenware, or other material which will not absorb moisture.

In the drawings, A is the under seat. B is the urine-guard; C, the upper seat, and D the space between the seats.

When the guard B is in position, as shown in section in Fig. 2, it laps over and covers the space D at the front of the water-closet bowl between the seats. To secure it in position a rabbet is made in the upper seat corresponding with that shown, E, and a recess is also made therein corresponding with and to receive the projection F of the guard. In the upper seat, also, holes will be made corresponding with holes or grooves H H in the guard, and keys fitting into these holes will assist in holding the guard in place. For further fastening, a nail, pin, or screw will be passed through the upper seat and the hole I of the guard. Other methods of securing it in place may be employed as conditions may dictate; but the one indicated is simple and efficient.

It is well known that in many water-closets much offense occurs from the trickling or flowing of urine between the seats or under the seat, and down on the inside of the "riser" as it is called. (Shown at K.) The guard is designed to prevent such offense.

Having thus fully described my invention, I claim as new and desire to secure by Letters Patent—

The combination, with the water-closet seats A C, having an intermediate space, D, of the guard B, lapping said space, having the projection F, and provided with grooves H, as and for the purpose specified.

DAVID SMITH.

Witnesses:
JOHN EDWARD McVEY,
WILLIAM ALFRED WILKINS.